J. C. Blackman,
Spoon.
№ 70,156. Patented Oct. 29, 1867.
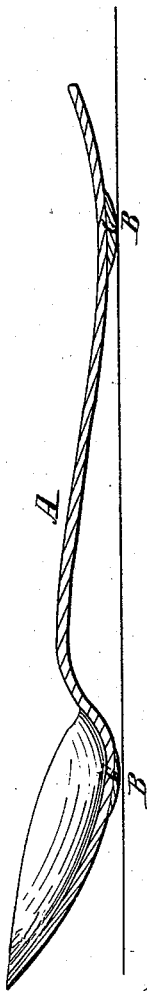
Witnesses.
Theo Tusdie
Wm Trewrn
Inventor.
J. C. Blackman
Per Munn
Attorneys.

United States Patent Office.

JARED C. BLACKMAN, OF WEST MERIDEN, CONNECTICUT.

Letters Patent No. 70,156, dated October 29, 1867.

IMPROVEMENT IN PLATED WARE.

*The Schedule referred to in these Letters Patent and making part of the same.*

TO ALL WHOM IT MAY CONCERN:

Be it known that I, JARED C. BLACKMAN, of West Meriden, in the county of New Haven, and State of Connecticut, have invented a new and useful Improvement in the Manufacture of Plated Ware; and I do hereby declare that the following is a full, clear, and exact description thereof, which will enable others skilled in the art to make and use the same, reference being had to the accompanying drawing, forming part of this specification.

This improvement is especially intended for use in connection with goods and articles that are to be plated with any of the precious metals, such as knives, forks, spoons, plates, waiters, cups, pitchers, urns, household articles, and vessels of all kinds.

By the usual method of plating such articles, the plating or covering of the precious metal is so exceedingly thin that it soon wears off from those portions that are most subjected to abrasion, namely, at the resting or contact points, and at such points the grosser metal composing the body of the article is soon exposed to view.

The object of this improvement is to prevent the exposure of the grosser metal; and my invention consists in applying to the said articles an additional or extra film of the precious metal at and near said resting or contact points. The said extra film is to be applied in any suitable manner, either before or after the plating of the articles is done.

Having thus stated the general object and nature of my invention, it will only be necessary for me to illustrate and describe a single form of its practical application.

The drawing represents an edge view of an ordinary spoon, with its resting or contact points shown in section.

A, the body of the spoon, made of any suitable material to be plated by any of the known means with precious metal. B, the ordinary contact or resting points of the spoon, where the abrasion or wearing off of the precious metal first occurs. C, the extra film of precious metal, which I insert or apply to the body of the spoon either before or after the plating is done. The method of applying the film C, which I prefer, is to inlay or solder the said film to the body A; or the film may be pressed into or upon the body A by means of a suitable press. After the film C has been applied to the body A, the latter is completely plated with a film of precious metal similar in kind to the film C.

It will be readily understood that when the contact or resting points of plated articles are protected by an extra film, substantially as I have described, no exposure of the grosser metal will be likely to occur in the ordinary use of such protected articles at such points.

I do not limit or confine my invention to any particular kind or form of plated ware, nor to the use of any particular number of protecting films. The said extra film is to be applied upon any portion of any kind of plated ware or article where its use may be desired.

I claim as new, and desire to secure by Letters Patent—

In the manufacture of plated ware or articles, providing such articles, at their points of rest or contact, with a thickness of the same metal as that with which they are plated, substantially as and for the purpose described.

JARED C. BLACKMAN.

Witnesses:
 NEWTON M. BLACKMAN,
 WHEELER A. TRACY.